(12) United States Patent
Burmester et al.

(10) Patent No.: US 10,662,868 B2
(45) Date of Patent: May 26, 2020

(54) REGULATING DEVICE FOR A TURBOCHARGER

(71) Applicant: IHI Charging Systems International GmbH, Ichtershausen (DE)

(72) Inventors: Hermann Burmester, Heidelberg (DE); Klaus Sperling, Heidelberg (DE); Manfred Guthörle, Neckarbischofsheim (DE); Rohit Pawar, Eppelheim (DE); Jason Walkingshaw, Heidelberg (DE); Daniel Senz, Korschenbroich (DE)

(73) Assignee: IHI Charging Systems International GmbH, Amt Wachsenbur (DE)

( * ) Notice: Subject to any disclaimer, the term of this patent is extended or adjusted under 35 U.S.C. 154(b) by 0 days.

(21) Appl. No.: 16/071,091

(22) PCT Filed: Feb. 9, 2017

(86) PCT No.: PCT/EP2017/000178
§ 371 (c)(1),
(2) Date: Jul. 19, 2018

(87) PCT Pub. No.: WO2017/144159
PCT Pub. Date: Aug. 31, 2017

(65) Prior Publication Data
US 2019/0136752 A1    May 9, 2019

(30) Foreign Application Priority Data

Feb. 23, 2016  (DE) .................. 10 2016 103 145
Jul. 7, 2016    (DE) .................. 10 2016 112 523

(51) Int. Cl.
*F02B 37/18*    (2006.01)
*F01D 17/10*    (2006.01)
*F16K 1/36*    (2006.01)

(52) U.S. Cl.
CPC .............. *F02B 37/18* (2013.01); *F01D 17/10* (2013.01); *F01D 17/105* (2013.01);
(Continued)

(58) Field of Classification Search
CPC ........ F01D 17/10; F01D 17/105; F02B 37/18; F02B 37/183; F05D 2220/40; F16K 1/36; Y02T 10/144
See application file for complete search history.

(56) References Cited

U.S. PATENT DOCUMENTS 3,144,876 A * 8/1964 Frye ................ F16K 15/03
                                                    137/454.5
3,511,475 A * 5/1970 Pfau ................ F16K 1/36
                                                    251/333

(Continued)

FOREIGN PATENT DOCUMENTS

DE    102010007600 A1    8/2011
DE    112009002230       9/2011
(Continued)

*Primary Examiner* — Jesse S Bogue
(74) *Attorney, Agent, or Firm* — Smartpat PLC

(57) ABSTRACT

The invention relates to a regulating device for a turbocharger. The regulating device (8) is received in a turbocharger (2) exhaust gas conducting section (1) through which exhaust gas can flow, and a fluid flow to a turbine wheel which is rotatably received in the exhaust gas conducting section (1) can be conditioned using the regulating device (8). A flow channel (10; 31) which is formed in the exhaust gas conducting section (1) is to be opened and closed using a cover element (9) of the regulating device (8), and the cover element (9) is arranged on a regulating device (8) pivot arm (38) which can be pivoted about a rotational axis (34). According to the invention, the cover element (9) is designed to open and close a flow channel designed as a bypass channel (31) for bypassing the turbine wheel and/or for opening and closing a flow channel, which is designed as (Continued)

a through-flow opening (10), between a first spiral channel (4) and a second spiral channel (5) of the exhaust gas conducting section (1).

20 Claims, 13 Drawing Sheets

(52) U.S. Cl.
CPC .............. *F02B 37/183* (2013.01); *F16K 1/36* (2013.01); *F05D 2220/40* (2013.01); *Y02T 10/144* (2013.01)

(56) References Cited

U.S. PATENT DOCUMENTS

| | | | |
|---|---|---|---|
| 4,794,758 A * | 1/1989 | Nakazawa | F01D 17/18 60/602 |
| 5,044,604 A * | 9/1991 | Topham | F16K 1/36 251/120 |
| 5,947,152 A * | 9/1999 | Martin | F16K 15/033 137/512 |
| 8,096,754 B2 * | 1/2012 | Naemura | F01D 17/105 415/144 |
| 8,820,709 B2 * | 9/2014 | Lombard | F01D 17/105 123/559.1 |
| 8,984,880 B2 * | 3/2015 | Marques | F01D 17/10 60/602 |
| 9,200,532 B2 * | 12/2015 | Palaniyappan | F01D 17/105 |
| 9,885,278 B2 * | 2/2018 | Dilalan | F02B 37/183 |
| 2007/0119170 A1 * | 5/2007 | Masson | F16K 1/2007 60/600 |
| 2011/0173974 A1 | 7/2011 | Grabowska | |
| 2011/0175025 A1 * | 7/2011 | Schall | F01D 17/105 252/182.33 |
| 2012/0292547 A1 | 11/2012 | Kierat et al. | |
| 2012/0312010 A1 * | 12/2012 | Yasoshima | F01D 17/105 60/602 |
| 2014/0174077 A1 | 6/2014 | Palaniyappan et al. | |
| 2015/0014564 A1 * | 1/2015 | Nagayo | F02B 39/00 251/177 |
| 2015/0125273 A1 * | 5/2015 | Tschirschke | F01D 17/105 415/145 |
| 2016/0178028 A1 * | 6/2016 | Lummer | F02B 37/186 251/321 |

FOREIGN PATENT DOCUMENTS

| | | | | |
|---|---|---|---|---|
| DE | 102010043147 A1 * | 10/2011 | | F02B 37/183 |
| DE | 112013002306 | 2/2015 | | |
| DE | 102015011256 A1 | 3/2016 | | |
| DE | 102015209044 A1 | 11/2016 | | |
| EP | 2444626 A1 | 4/2012 | | |

* cited by examiner

REGULATING DEVICE FOR A TURBOCHARGER

TECHNICAL FIELD

The invention relates to a regulating device for an exhaust gas turbocharger.

BACKGROUND

Exhaust gas conducting sections for exhaust gas turbochargers, which comprise a regulating device for regulating a fluid, generally exhaust gas, flowing through the exhaust gas conducting section, are known. The regulating device is provided for opening and closing a bypass duct in the through-flow exhaust gas conducting section for bypassing a turbine wheel of the exhaust gas conducting section which is rotatably arranged in a wheel chamber of the exhaust gas conducting section. It comprises a cover element for opening and closing a flow cross-section of the bypass duct. By means of such a regulating device, it is possible to bypass the turbine wheel completely or partially in defined operating points of the exhaust gas turbocharger, in particular in operating points, which exhibit large flow quantities, so that an efficient operation of the exhaust gas turbocharger is achieved.

Additionally, it is required to provide a through-flow opening of a double-flow turbine which comprises a first spiral duct and a second spiral duct with a movable cover element which allows both an overflow of exhaust gas from the one spiral duct into the other one and an outflow into the bypass duct.

It is the object of the present invention to provide a regulating device for an exhaust gas turbocharger, which allows a compact construction of the exhaust gas turbocharger.

SUMMARY

According to the invention, this object is solved by a regulating device for an exhaust gas turbocharger as claimed.

An inventive regulating device for an exhaust gas turbocharger is accommodated in a through-flow exhaust gas conducting section of the exhaust gas turbocharger. By means of it, a fluid flow to a turbine wheel which is rotatably accommodated in the exhaust gas conducting section can be controlled. A flow channel which is formed in the exhaust gas conducting section may be opened and closed by means of a cover element of the regulating device, wherein the cover element is arranged on a pivot arm of the regulating device which is pivotable about an axis of rotation. For cost saving and wear reduction purposes, the cover element is formed at least in two parts and/or at least partially hollow.

The configuration of the cover element as an at least two-part component is advantageous in that in particular for a design of the hollow cover element the cover element may be realized by means of low-cost manufacturing methods. For example, so-called 3D printing techniques, such as e. g. "Selective Laser Melting" may be employed. Even with a solid cover element, a two-part design may be advantageous, if e. g. an undercut is necessary for achieving a certain outer contour, which is difficult to achieve in a casting process.

In order to reduce the forces which are required for moving the cover element, in the following referred to as moving forces, and for wear reduction, the cover element is formed at least partially hollow. This is advantageous in that the corresponding actors may be built smaller and thus less expensive because of the reduced moving forces. A small actor also contributes to realize a compact construction.

In an embodiment, the cover element for opening and closing a flow channel which is formed as a bypass duct for bypassing the turbine wheel and/or for opening and closing a flow channel which is formed as a through-flow opening between a first spiral duct and a second spiral duct of the exhaust gas conducting section.

The advantage is given by the possibility to provide a compact exhaust gas conducting section, because the cover element is configured for opening and closing several exhaust gas through-flow channels of the exhaust gas conducting section. This means in other words that both the first flow cross-section and the second flow cross-section may be opened and closed by means of a single element. In addition to a compact construction, this results in a cost effective manufacture of the exhaust gas turbocharger, because the number of the parts of the unit is reduced. Furthermore, this leads to a simplified regulation of the flow cross-sections, because only one single cover element has to be moved. The cover element is mounted on a pivot arm of the regulating device, which is pivotable about an axis of rotation. Due to the potential rotational movement, relatively small activating forces for moving the corresponding cover element are required.

In another embodiment, the cover element exhibits a pot-shaped outer contour. Such an outer contour enables the realization of various opening cross-sections or different opening characteristics, respectively, of the regulating device in a simple manner. Depending on the design of the outer contour a degressive, linear or progressive opening characteristic may be achieved, in particular the opening characteristic of the first flow cross-section may be designed differently to the second flow cross-section.

The term opening characteristic describes how the flow cross-section is opened depending on a travel or on an actuating angle, respectively, of the cover element. Basically, the opening characteristic reflects an actually opened flow cross-section depending on the position of the cover element and thus depending on the travel of the cover element. The opening characteristic may be degressive, linear, progressive or a combination of these.

Preferably, the cover element comprises an element body and a base plate covering the element body, wherein in the case of the hollow cover element the base plate may seal the element body. Thereby, a flow loss due to e. g. an accumulation of exhaust gas in the element body may be prevented. The base plate is further provided as a connection with the pivot arm. In particular, this is to be provided for a pot-shaped element body which may be tightly sealed at its open wall surface by means of the base plate.

In a preferred embodiment, the element body comprises a body base cross-section and the base plate comprises a plate cross-section, which are different from each other. The different cross-sections are advantageous in that an annular surface may be formed at the base plate, which surrounds the element body, which may serve as a seal in a closed position of the cover element. This annular surface is to be formed in contact with a casing wall of the exhaust gas conducting section, whereby sealing, in other words, leakage prevention may be realized.

In another embodiment, the base plate has a plate cross-section which is smaller than a body base cross-section of the element body. The advantage is that a seam between the element body and the base plate in the area of the annular surface formed as a sealing surface may be omitted.

In a cost effective embodiment, the base plate is formed from sheet metal. The advantage is the low-cost manufacture of the base plate in e. g. a punching or a deep-drawing method.

In another embodiment, the base plate and the element body are formed from different materials, wherein the materials exhibit different wear resistance values. In particular, the base plate has to be formed from a material with high wear resistance because it represents a connection of the cover element with the moving device. On the other hand, the element body is subjected to a high exhaust gas temperature due to its positioning between the two spiral ducts. Therefore, it has to be manufactured from a heat resistant material. In this manner, a low cost cover element with a long service life may advantageously be provided from different materials.

In another embodiment, the cover element comprises a groove which is formed so that it surrounds the cover element at least partially. This is advantageous in that the cover element may thus at least partially accommodate a wall of the exhaust gas conducting section, which ensures that in the closed position of the cover element no overflow from the one spiral duct into the other one occurs, or that in the closed position, respectively, of the covering element no outflow into the bypass duct occurs. In addition, it may be ensured, in particular if the covering element is formed as the cover element, that e. g. the second flow cross-section is opened before the first cross-section, provided this is required by a corresponding operation of the combustion engine.

In another embodiment, the groove is formed asymmetrically. This means that the groove which extends over the circumference is e. g. formed deeper on one side of the cover element than on the other side. The asymmetry relates to a longitudinal axis of the cover element, at which a radius of rotation or pivoting, respectively, of the movement device starts. The radius of rotation or pivoting, respectively, thus corresponds to a pivot arm, at one end of which the cover element is mounted, and about the other end of which it is rotated or pivoted, respectively. The cover element is accommodated in the flow channel, wherein it contacts the channel walls or the walls of the exhaust gas conducting section, respectively, in its closed position. With respect to its shape a movement of the cover element requires free movability relative to the exhaust gas conducting section, which is obtained by means of the asymmetric groove.

In a cost effective and simple manufacture, the element body and the base plate are firmly material-bonded to each other.

In another embodiment, the element body and the base plate are caulked. The benefit of caulking may also be seen in the fact that dissimilar materials may be joined. Another advantage of caulking is the possibility of transferring a higher torque compared to e. g. firmly bonding the workpieces, because the two workpieces are wedged during caulking.

In another embodiment of the inventive regulating device, the cover element is fixed at the pivot arm by means of a fixing element, which is arranged facing an arm surface of the pivot arm facing the cover element. This means in other words, the fixing element is positioned on the side of the pivot arm, which faces the cover element. Thereby, the fixing element may be arranged in the element body. The benefit is an accommodation which protects the fixing element against aggressive and hot exhaust gases.

Another advantage is a reduction of disturbing noise which originates upon a movement of the regulating device due to a relative movement of the cover element and of the pivot arm. This noise is generated by the two components forming the connecting point due to their relative movement. Because the connecting point is formed within the cover element and is so to speak encapsulated, the noise emission is reduced.

In a further embodiment, the pivot arm comprises a receiving element which protrudes into the cover element. The benefit is a reduced or potentially eliminated torque which acts on a connecting point formed between the pivot arm and the cover element. A resulting compressive force which is applied to the cover element and directed transversely to the longitudinal axis of the cover element generates a torque acting on the connecting point. Because the connecting point is close to a point of application of the compressive force due to the receiving element which is directed in the direction of the cover element and protruding into the cover element, a shortening of a torque lever arm results, which extends from the connecting point to the point of application of the compressive force. Because of the reduced torque, a regulating device is obtained which exhibits reduced wear.

A bonded, in particular a welded connection between the fixing element and the receiving element is advantageous in that the fixing element is firmly secured at the receiving element. The weld seam which is subjected to tensile stress between the fixing element and the receiving element is shielded against the aggressive and hot exhaust gases by the element body, whereby an enhanced durability of the weld seam and thus of the connection between the cover element and the pivot arm is achieved.

Further advantages, features and details of the invention result from the following description of preferred exemplary embodiments as well as from the drawing. The above mentioned features and feature combinations in the description as well as the following features and feature combinations in the description of the figures are not only applicable in the indicated combination but also in other combinations or alone, without deviating from the scope of the invention. Equivalent elements or elements with the same functions are assigned identical reference numerals.

DETAILED DESCRIPTION

Figure 1:
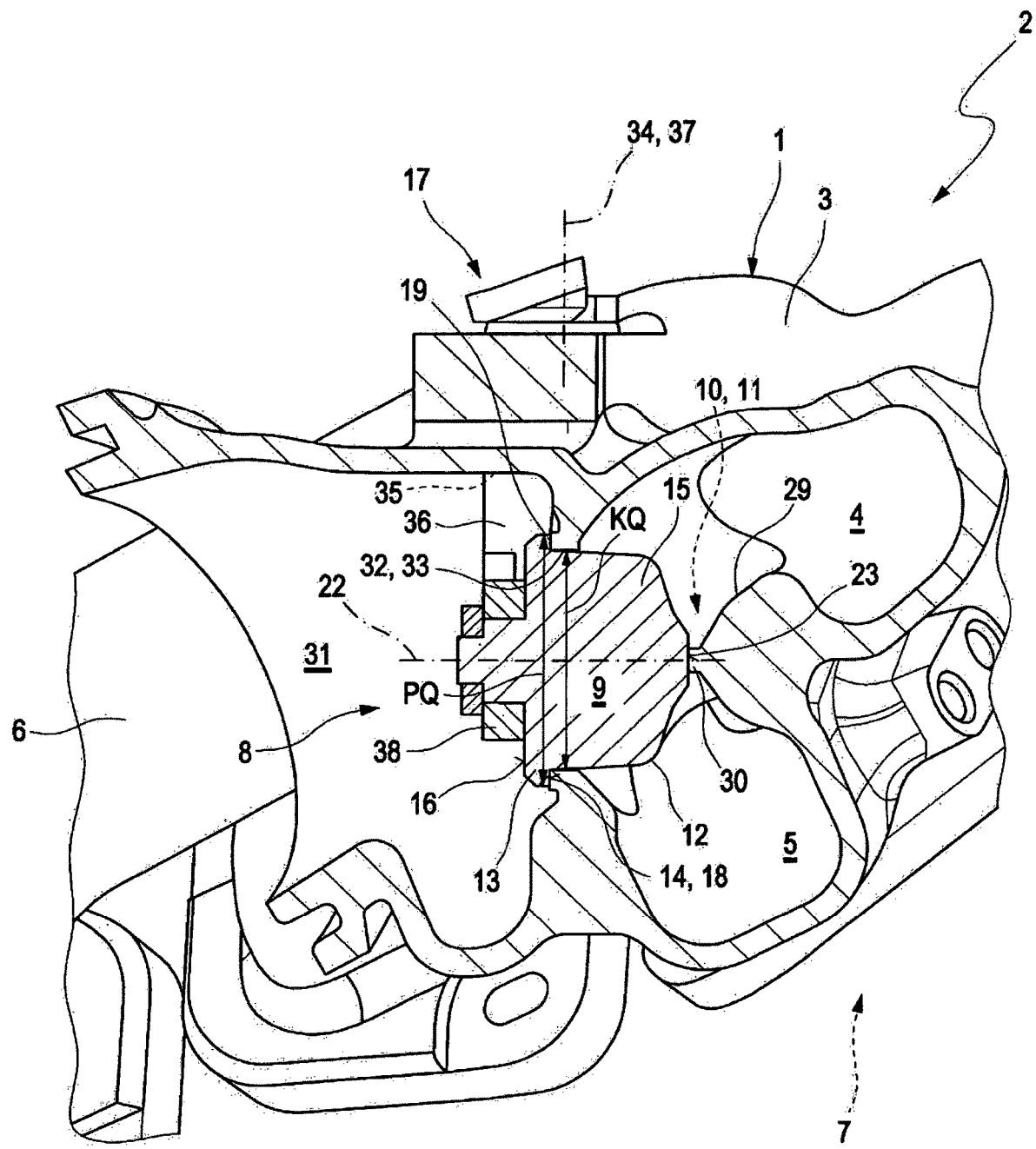
FIG. 1 shows in a perspective sectional view an exhaust gas conducting section of an exhaust gas turbocharger with an inventive regulating device in a first exemplary embodiment.

A through-flow exhaust gas conducting section 1 of an exhaust gas turbocharger 2 formed according to FIG. 1 comprises an inlet duct 3 for the introduction of a fluid flow into the exhaust gas conducting section 1, generally exhaust gas of a combustion engine 7, a first spiral duct 4 and a second spiral duct 5 downstream of the inlet duct 3 for controlling the flow and an outlet duct (not shown in detail) downstream of the spiral ducts 4, 5, via which the exhaust gas may escape in a controlled manner out of the exhaust gas conducting section 1. A wheel chamber (not shown in detail) is formed between the spiral ducts 4, 5 and the outlet duct, in which a turbine wheel (not shown in detail) is rotatably accommodated.

The exhaust gas conducting section 1 is connected with an exhaust gas manifold 6 of the combustion engine 7 so that the exhaust gas from the combustion engine 7 may enter via the inlet duct 3 into the spiral ducts 4, 5 to be applied to the turbine wheel.

A regulating device 8 for disconnecting and connecting the first spiral duct 4 and the second spiral duct 5 is arranged in the exhaust gas conducting section 1 for adjusting an operating behavior of an exhaust gas turbocharger 2 to the fluid flow of the combustion engine. A cover element 9 of the regulating device 8 is arranged in a through-flow opening 10 which is formed to allow a through-flow through the two spiral ducts 4, 5.

In a first position, the closed position of the cover element 9, as shown in FIG. 1, the two spiral ducts 4, 5 can be flowed completely separated from each other, wherein the through-flow opening 10 is fully closed by means of the cover element 9. The exhaust gas from the combustion engine flows through the two spiral ducts 4, 5, wherein a first portion of the exhaust gas flows through the first spiral duct 4 and a second portion of the exhaust gas flows through the second spiral duct 5.

In a second position of the cover element 9 (not shown in detail), the through-flow opening 10 is fully open and exhaust gas may overflow from the first spiral duct 4 into the second spiral duct 5 and vice versa. This means that exhaust gas from the one spiral duct 4, 5 may overflow into the other spiral duct 5; 4 via the through-flow opening 10 with a first flow cross-section 11.

The cover element 9 is to be positioned in further intermediate positions between the first position and the second position so that the first flow cross-section 11 is adjustable, if required, to achieve an optimum efficiency of the exhaust gas turbocharger 2 depending on the through-flow of the exhaust gas quantity.

In order to obtain an operation-adapted opening of the first flow cross-section 11, progressive, degressive or linear, the cover element 9 comprises a pot-shaped outer contour 12. It comprises a base plate 13 which accommodates an element body 15 on a first plate surface 14. On the base plate 13, a movement device 17 of the regulating device 8 is fixed on a second base plate 16 facing away from the element body 15.

The element body 15 has a body base cross-section KQ which is smaller than a plate cross-section PQ of the first plate surface 14. The body base cross-section KQ corresponds to the cross-section of the element body which is present at the end of the element body 15 facing the base plate 13. Thereby, an annular surface 18 is formed which completely surrounds the element body 15. On the one hand, this annular surface 18 serves to support the cover element 9 on a first channel wall 19 of the through-flow opening 10 and on the other hand, it serves as a sealing surface for sealing the two spiral ducts 4, 5 in the first position of the cover element 9.

In addition, a bypass duct 31 is provided in the through-flow exhaust gas conducting section 1 for bypassing the wheel chamber in the exhaust gas conducting section 1. The bypass duct 31 comprises an inlet opening 32 with a second flow cross-section 33, wherein the inlet opening 32 may be completely or partially closed by means of the regulating device 8, or may be completely or partially opened, respectively, by means of the cover element 9.

The cover element 9 is accommodated rotatably or for a pivoting movement, respectively, in the exhaust gas conducting section 1, wherein the cover element 9 may be pivoted about an axis of rotation 34 of the cover element 9 in the bypass duct 31. This means in other words, the cover element 9 is accommodated for carrying out a rotational movement or a pivoting movement, respectively, in the exhaust gas conducting section 1, wherein the second flow cross-section 33 of the inlet opening 32 as well as the first flow cross-section 11 of the through-flow opening 10 are adjustable by means of the pivoting movement.

For the movability of the cover element 9 and thus of the regulating device 8, a cylinder-shaped opening 35 is formed in the exhaust gas conducting section 1, in which a shaft 36 with a second longitudinal axis 37 of the regulating device 8, which corresponds to the axis of rotation 34, is rotatably accommodated. A swivel arm 38 which is arranged between shaft 36 and the cover element 9 serves as a connection of the cover element 9 with the shaft 36 so that the cover element 9 may be pivoted by the rotation of the shaft 36.

For achieving the corresponding opening characteristic, the element body 15 preferably comprises two element sections, a first element section 20 and a second element section 21, which are arranged in series in the direction of a longitudinal axis 22 of the element body 15. The first element section 20 is firmly connected with the base plate 13 and arranged between the second element section 21 and the base plate 13. The second element section 21 is also firmly connected with the first element section 20. The second element section 21 comprises a top surface 23 of the cover element 9, which faces away from the first element section 20.

Figure 2:
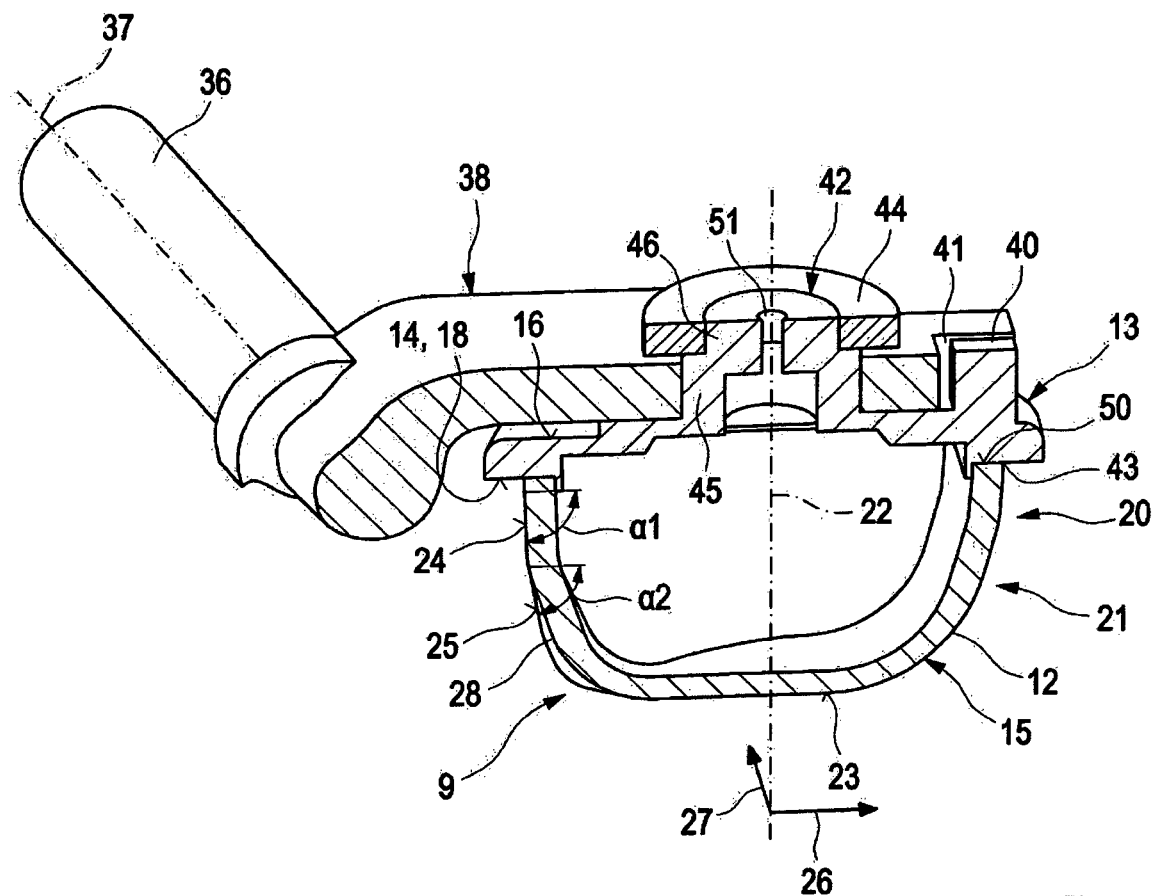
FIG. 2 shows in a perspective sectional view with a section along a first sectional plane a cover element of the regulating device according to FIG. 1 with a pivot arm of the regulating device.

The cover element 9 is illustrated in a perspective sectional view with a section along a first sectional plane in FIG. 2. The first sectional plane extends between the longitudinal axis 22 and a first transverse axis 26 formed orthogonally to the longitudinal axis 22.

A securing pin 40 is formed on the second plate surface 16, which serves as an anti-rotation lock of the cover element 9 on the swivel arm 38. The securing pin 40 is formed to engage with the swivel arm 38. For this purpose, the swivel arm 38 comprises a further groove 41 at its end facing away from the shaft 36, which accommodates the securing pin 40. This is advantageous in that because of a rotation-symmetrical mounting pin 42 which is formed on the second plate surface 16 for accommodating the cover element 9 at the swivel arm 38, rotation of the cover element 9 about its longitudinal axis 22 may occur.

The first element section 20 and the second element section 21 comprise inclined outer surfaces 24, 25 which principally start from the base plate 13 in the direction of the top surface 23 in the direction of the longitudinal axis 22. A first angle of inclination α1 of the first outer surface 24 of the first element section 20 is greater than a second angle of inclination α2 of the second outer surface 25 of the second element section 21.

The body base cross-section KQ as well as the plate cross-section PQ are ovally formed. The element body 15 has a groove 28 with a width BR, which extends over its circumference along the first transverse axis 26 across the top surface 23. Thereby, the cover element 9 comprises a groove 28 which surrounds the element cover 9 at least partially. In the first exemplary embodiment according to FIG. 2, the body base cross-section KQ is smaller than the plate base cross-section PQ.

For reliable sealing the first spiral duct 4 and the second spiral duct 5 in the first position, a second channel wall 29 opposite the first channel wall 19 comprises a protrusion 30 which is shaped complementary to the groove 28, see FIG. 1.

The cover element 9 is a two-piece part, whereby the hollow body may preferably be realized. The base plate 13 represents a first part of the cover element 9 and the element body 15 represents a second part of the cover element 9, wherein the base plate 13 is formed covering the element body 15. The element body 15 is formed pot-shaped and is sealed against through-flow at a wall surface 50 facing the base plate by means of the base plate 13.

Figure 3:
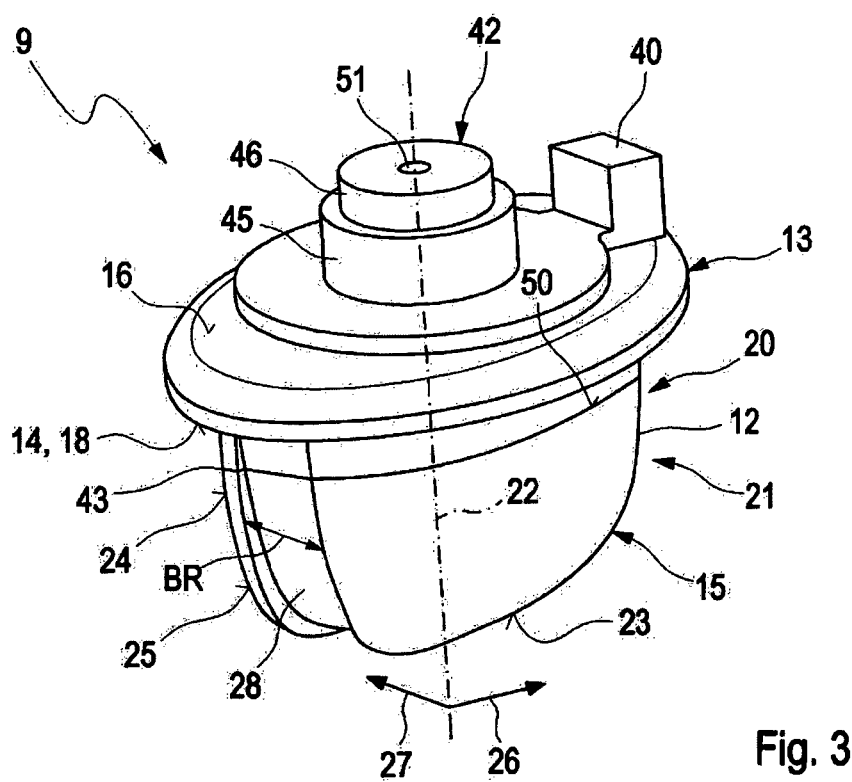
FIG. 3 shows in a perspective view the cover element in a second exemplary embodiment.

FIG. 3 is a perspective view of the cover element 9 in a second exemplary embodiment. The base plate 13 comprises a ring on its first plate surface 14, which corresponds to an upper portion of the element body 15 of the first exemplary embodiment, which faces the base plate 13. This is advantageous in respect of manufacturing issues because a seam, e. g. a weld seam, in the annular surface 18 formed as a sealing surface is avoided.

Figure 4:
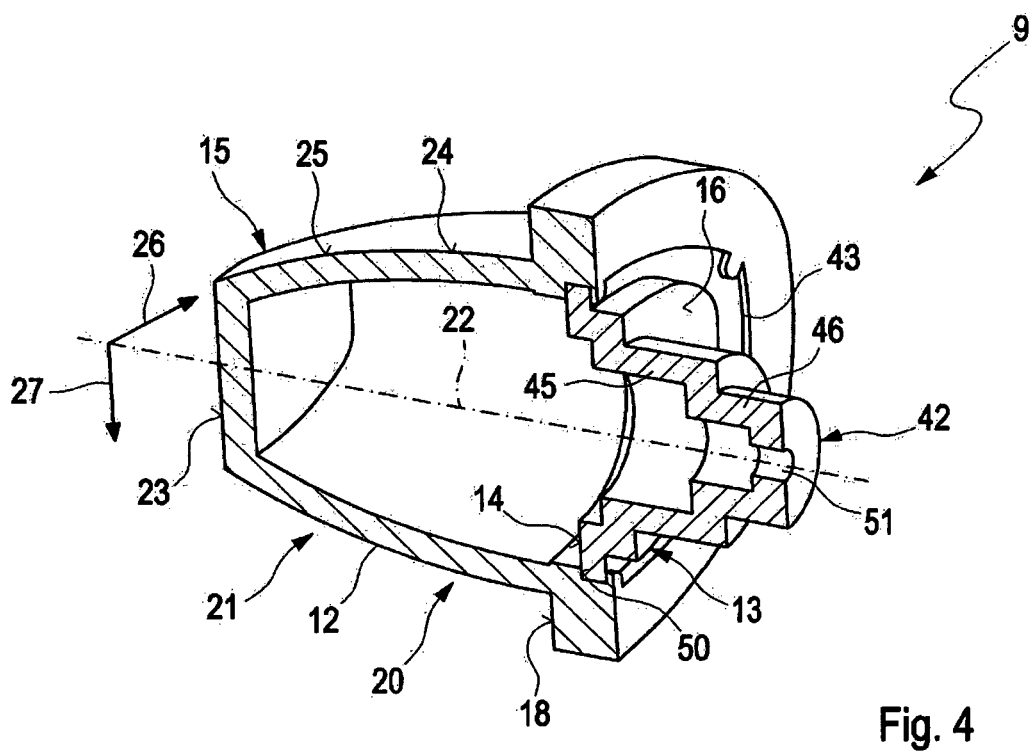
FIG. 4 shows in a perspective sectional view with a section along a second sectional plane the cover element in a third exemplary embodiment.

FIG. 4 shows the cover element 9 in a third exemplary embodiment in a perspective sectional view with a section along a second sectional plane between the longitudinal axis 22 and the second transverse axis 27. In this exemplary embodiment, the body base cross-section KQ is greater than the plate base cross-section PQ, wherein the annular surface 18 is arranged at a great distance to the seam 43 between the base plate and the element body.

Figure 5:
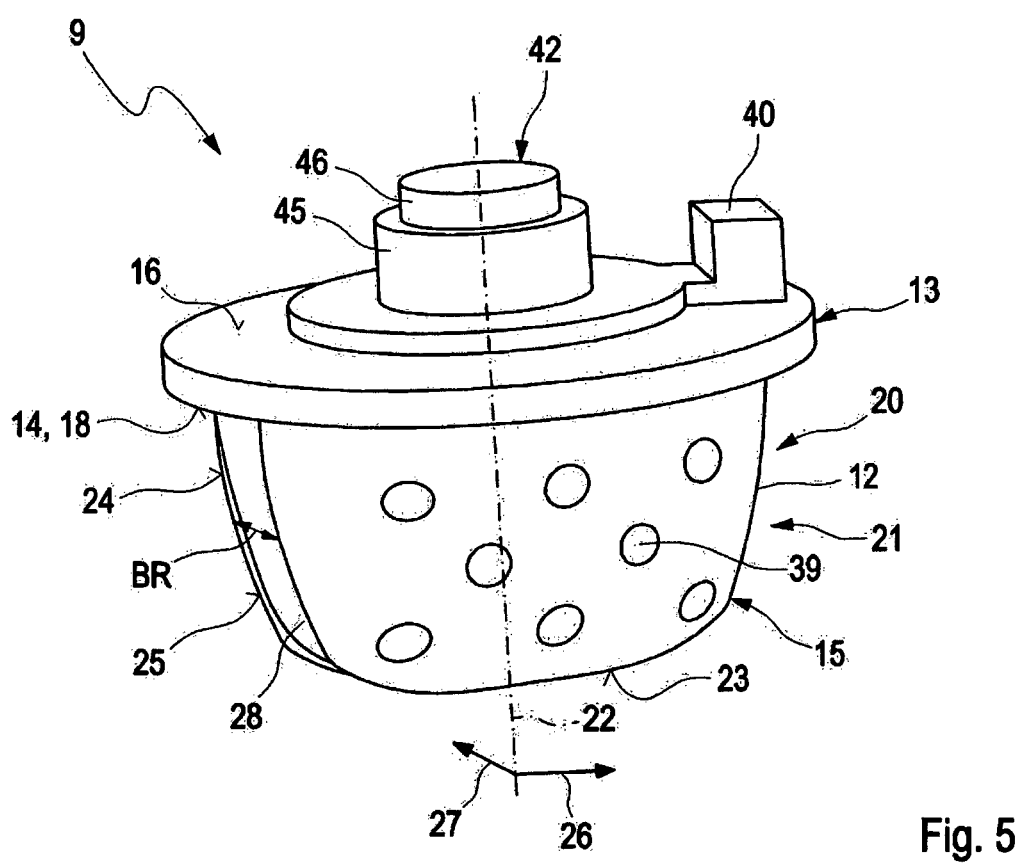
FIG. 5 shows in a perspective view the cover element in a fourth exemplary embodiment.
Figure 6:
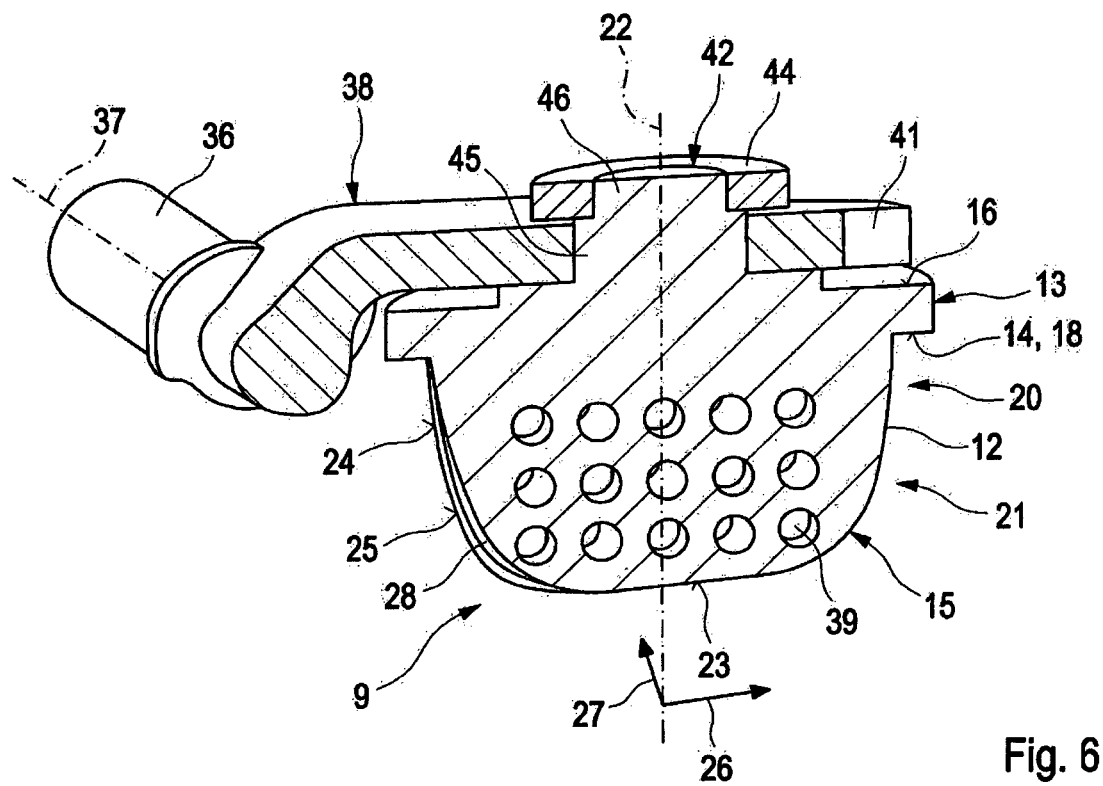
FIG. 6 shows in a perspective sectional view with a section along the first sectional plane the cover element according to FIG. 5 with the pivot arm of the regulating device.
Figure 7:
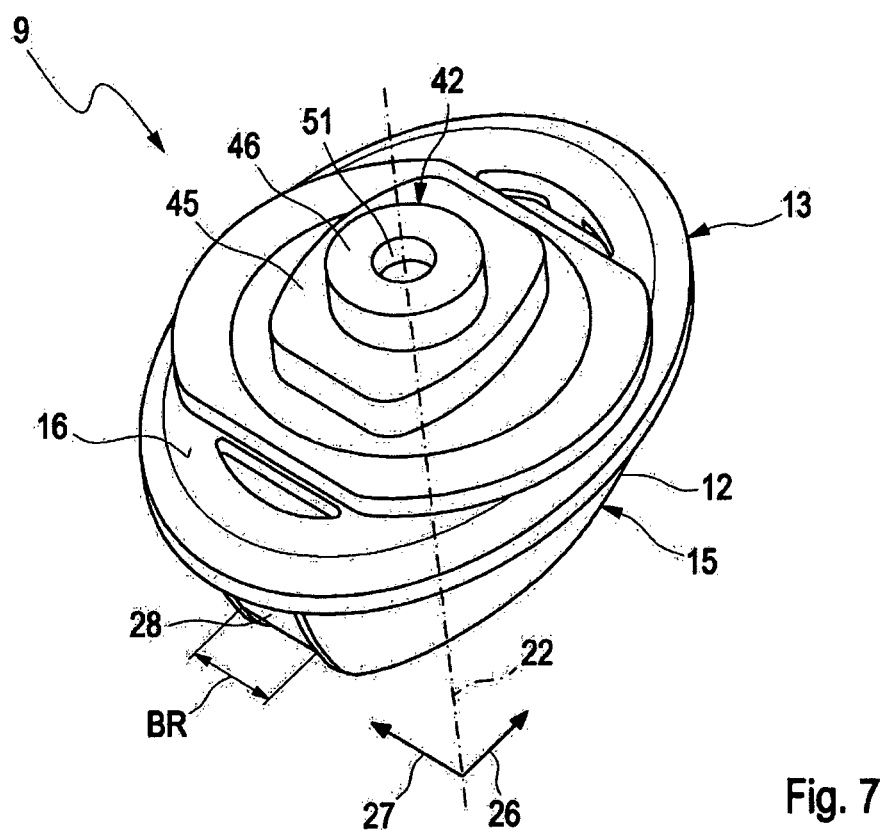
FIG. 7 shows in a perspective plan view the cover element in a fifth exemplary embodiment.
Figure 8:
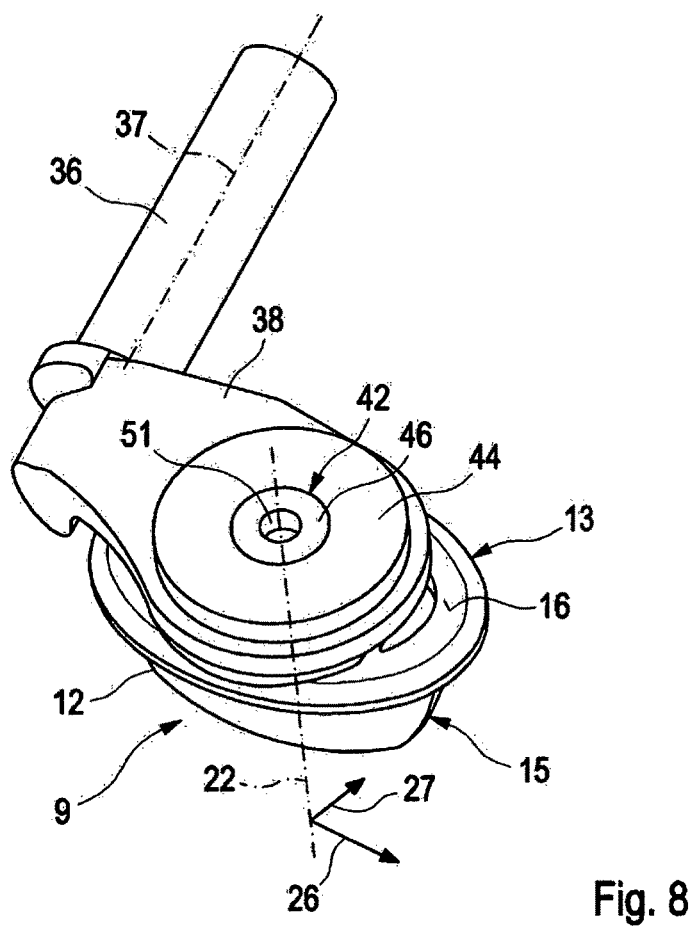
FIG. 8 shows in a perspective plan view the cover element according to FIG. 7 with the pivot arm of the regulating device.
Figure 9:
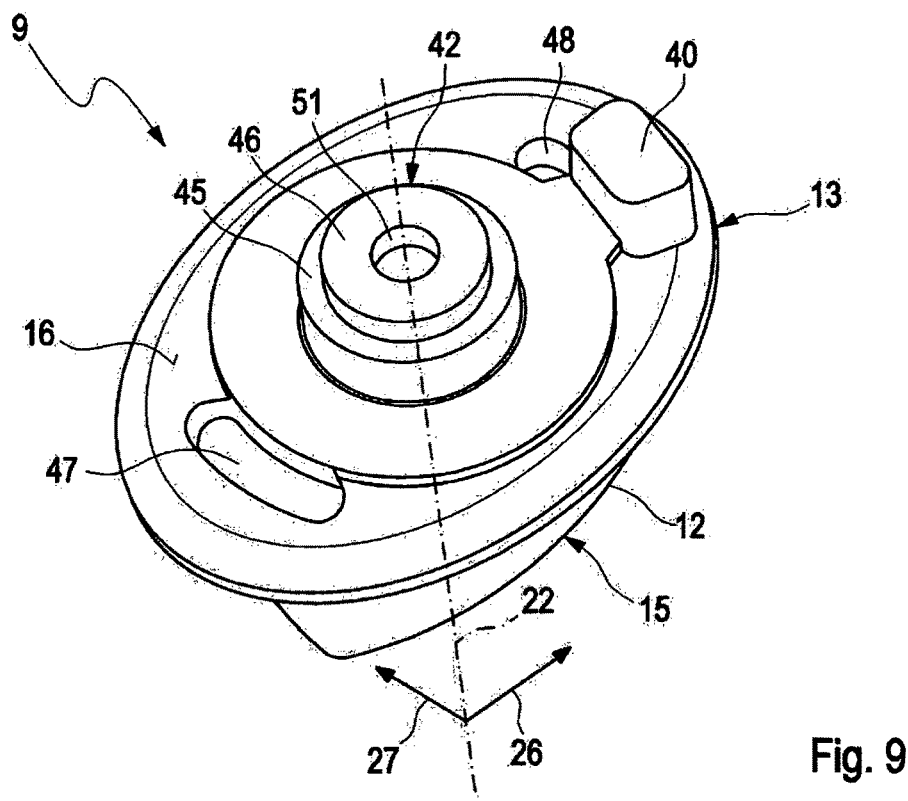
FIG. 9 shows in a perspective plan view the cover element in a sixth exemplary embodiment.
Figure 10:
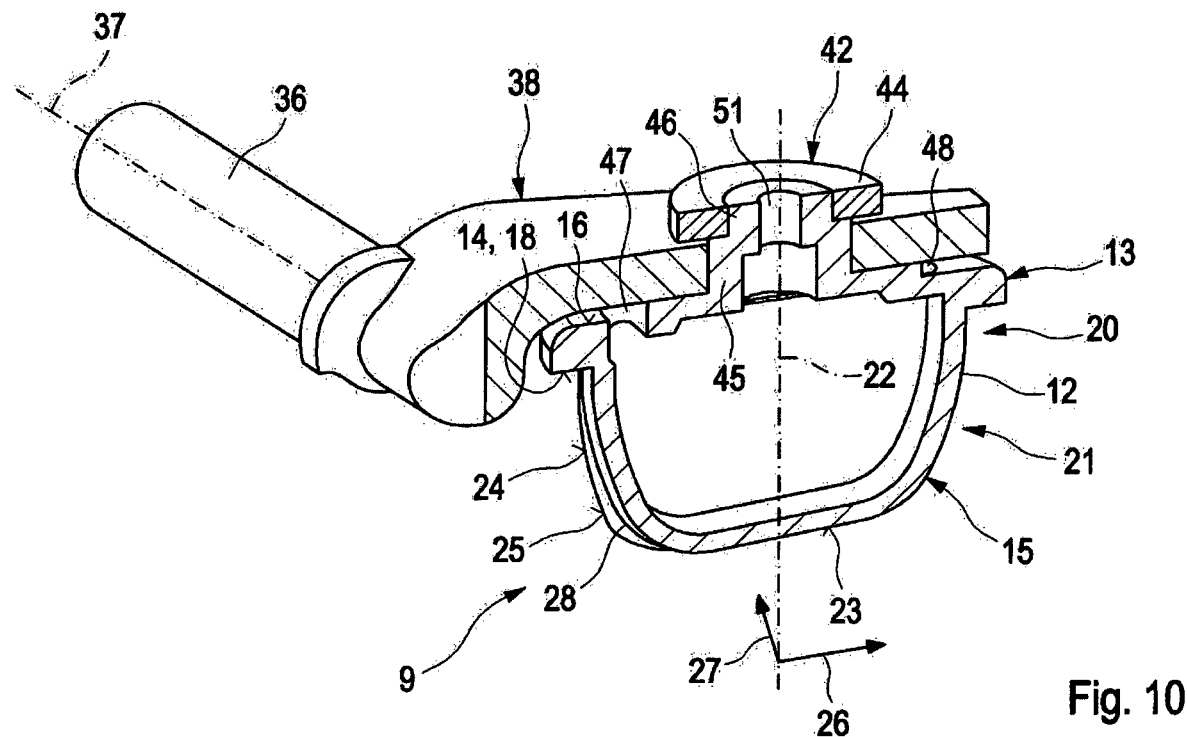
FIG. 10 shows in a perspective plan view the cover element according to FIG. 9 with the pivot arm of the regulating device.

In order to reduce the total weight of the regulating device 8, the cover element 9 is formed as a hollow body. In a fourth exemplary embodiment according to FIGS. 5 and 6, the cover element 9 comprises through-holes 39. The holes 39 could as well penetrate the element body 15 only partially. Thus, the cover element 9 is formed at least partially hollow.

FIGS. 7 to 10 show the cover element 9 in a fifth and in a sixth exemplary embodiment. The element body 15 corresponds to the element body 15 of the first exemplary embodiment. For securing the cover element 9 against rotation relative to the swivel arm 38, a mounting pin 42 of the fifth exemplary embodiment is formed rectangularly in a first pin area 45 in the swivel arm 38, so that a rotatory movement about the longitudinal axis 22 is prevented. A second pin area 46 of the mounting pin 42 is welded to a cover disk 44 for the reliable support of the cover element 9 at the swivel arm 38. The second pin area 46 could as well be riveted to the cover disk 44.

For preventing the rotatory movement about the longitudinal axis 22, the sixth exemplary embodiment comprises a first locking groove 47 and a second locking groove 48 in the base plate 13 in addition to the securing pin 40, which penetrate the base plate 13 completely. They might as well be formed penetrating the base plate 13 only partially. Opposite arranged additional securing pins engage with these locking grooves 47, 48 on the swivel arm 38 of the base plate 13, the majority of which is formed complementary to the locking grooves 47, 48.

Figure 11:
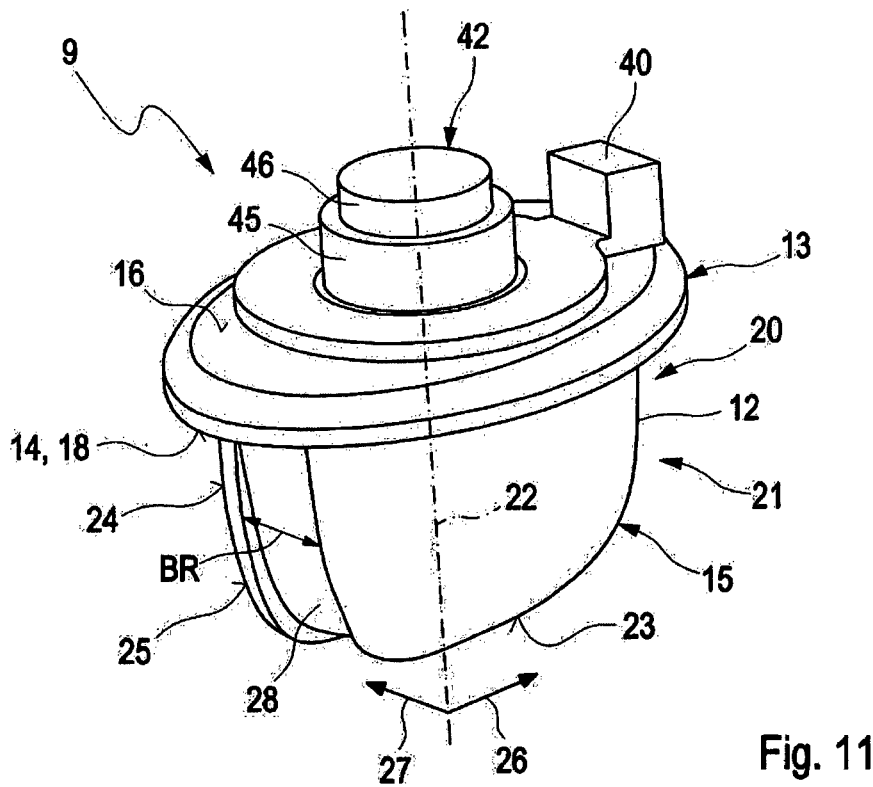
FIG. 11 shows in a perspective plan view the cover element in a seventh exemplary embodiment.
Figure 12:
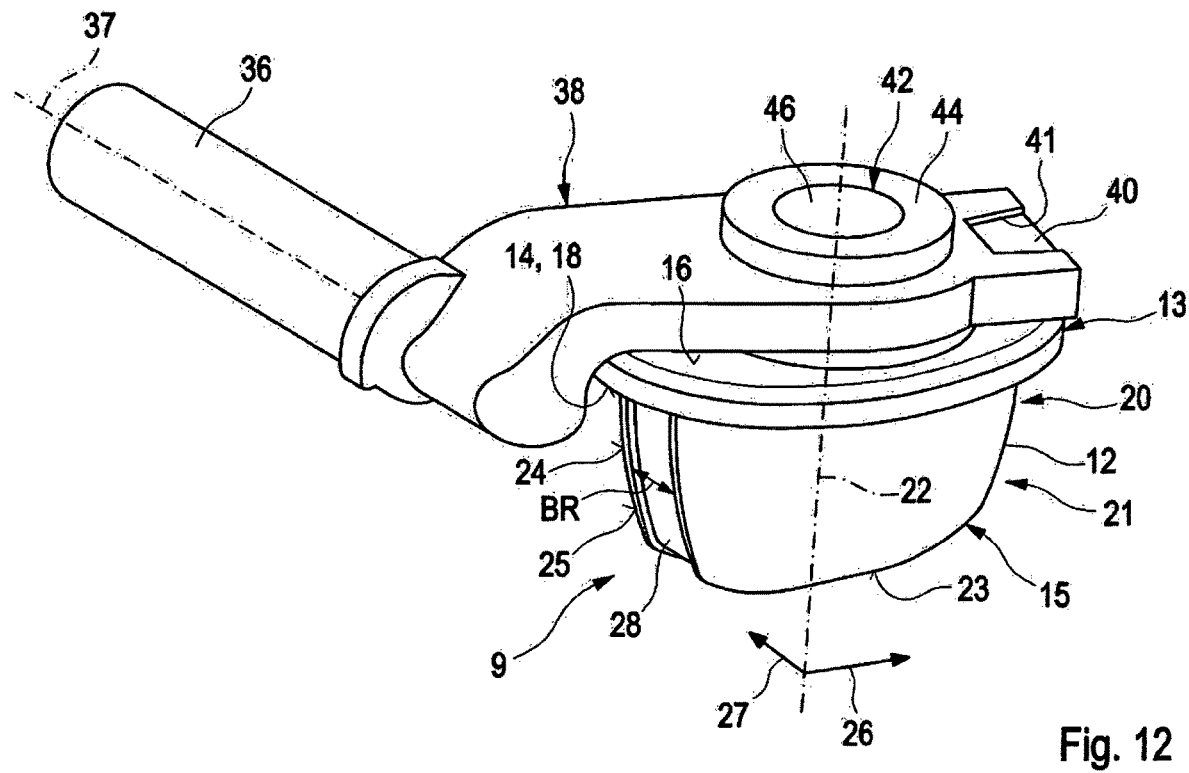
FIG. 12 shows in a perspective plan view the cover element according to FIG. 11 with the pivot arm of the regulating device.

The cover element 9 is illustrated in a seventh exemplary embodiment in FIGS. 11 and 12. In this seventh exemplary embodiment, the cover element 9 is formed as a solid body, i. e. compact, and does not exhibit vent holes 51.

Figure 13:
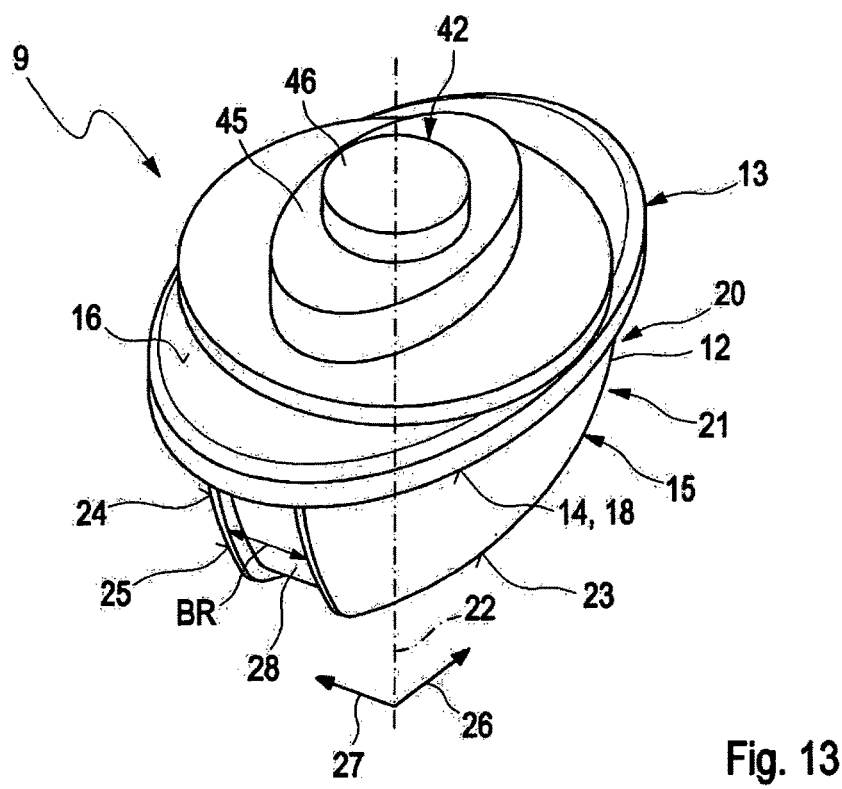
FIG. 13 shows in a perspective plan view the cover element in an eighth exemplary embodiment.
Figure 14:
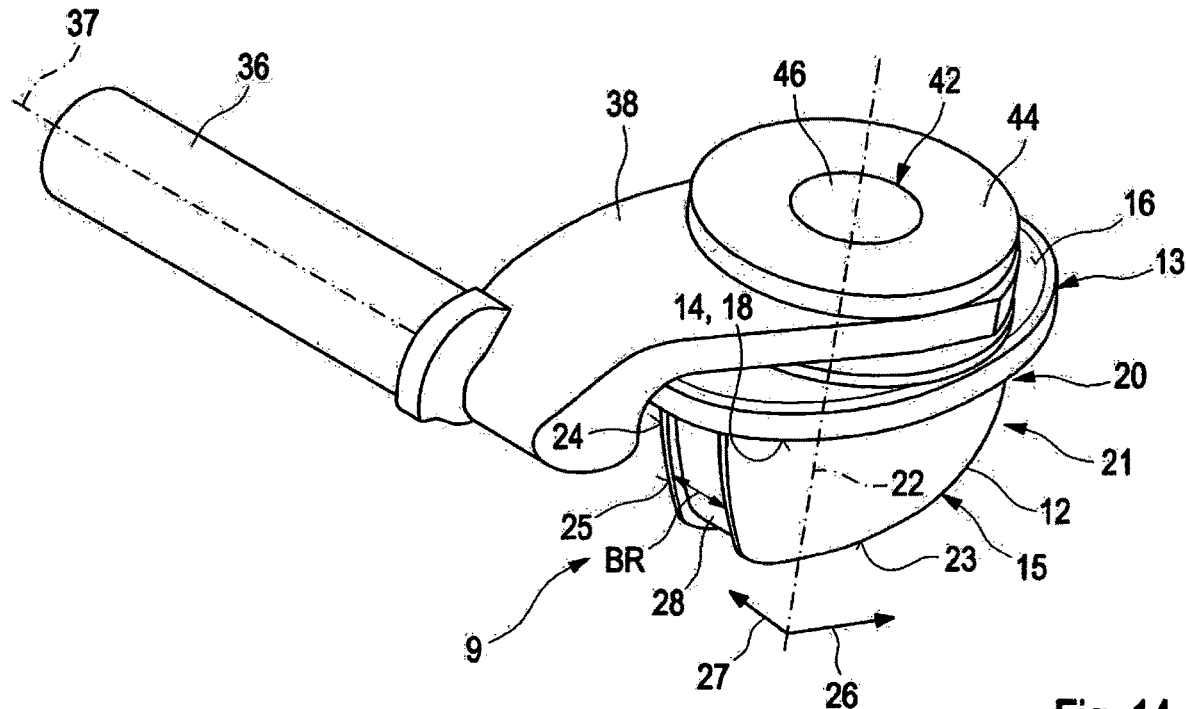
FIG. 14 shows in a perspective plan view the cover element according to FIG. 13 with the pivot arm of the regulating device.

The eighth exemplary embodiment shown in FIGS. 13 and 14 represents another alternative for preventing the rotatory movement about the longitudinal axis 22. In this exemplary embodiment, the first pin area 45 is formed elliptical, whereby a rotatory movement is also prevented, with the complementarily formed reception hole (not shown in detail) of the swivel arm 38.

Figure 15:
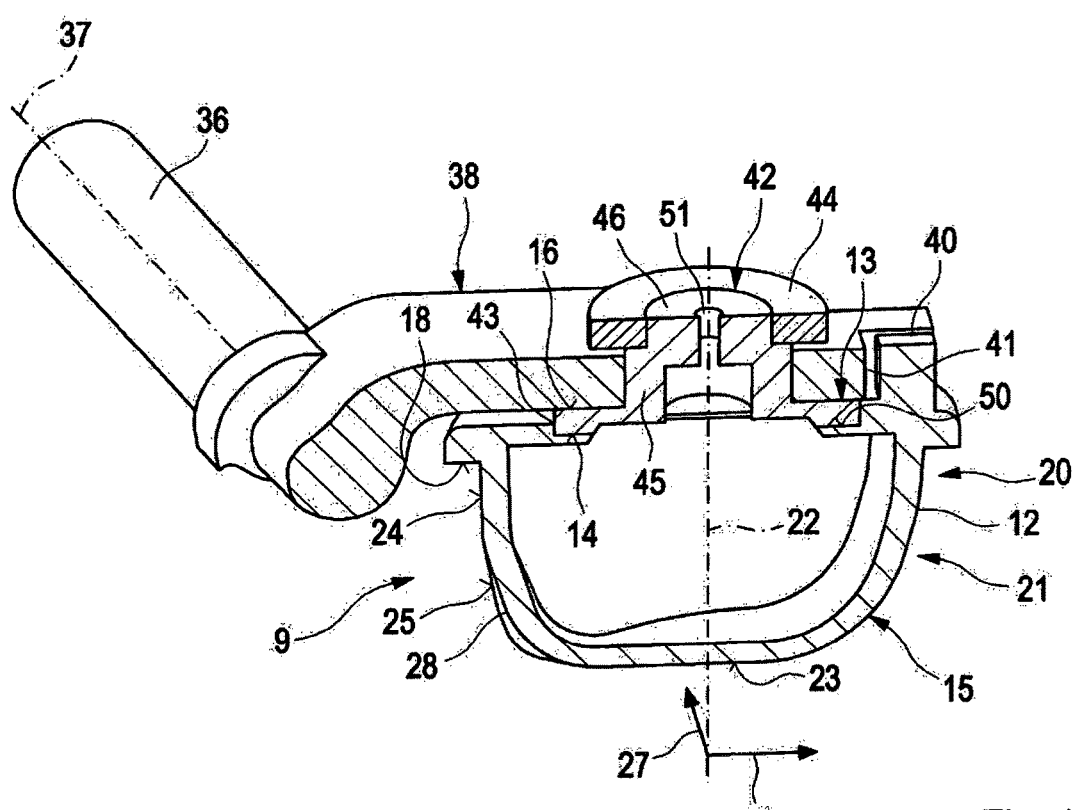
FIG. 15 shows in a perspective sectional view the cover element with the pivot arm of the regulating device in a ninth exemplary embodiment.
Figure 16:
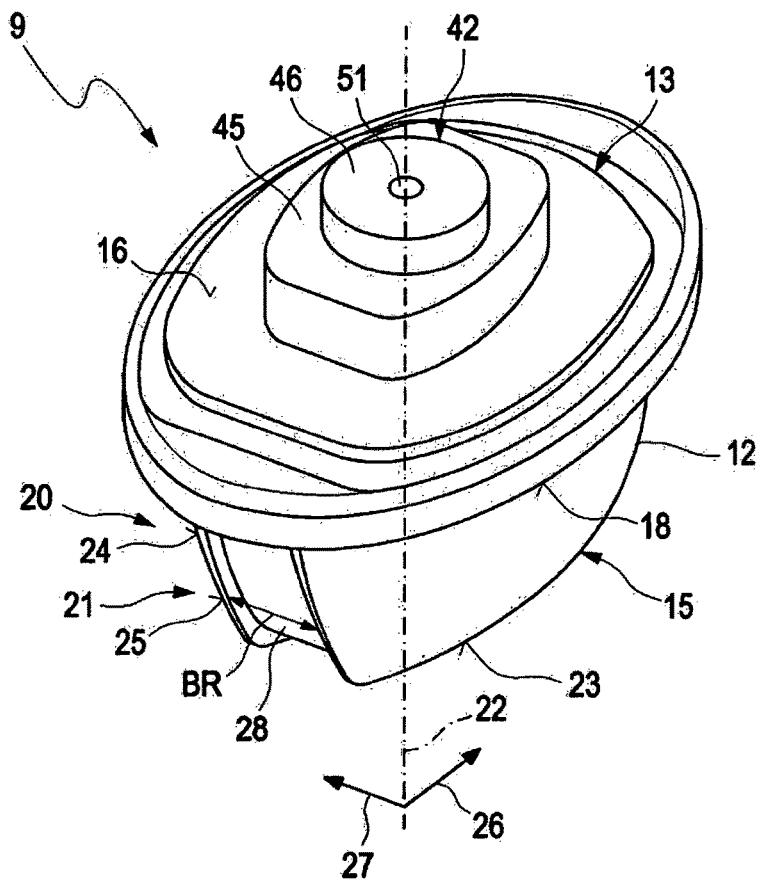
FIG. 16 shows in a perspective plan view the cover element with the pivot arm of the regulating device in a tenth exemplary embodiment.
Figure 17:
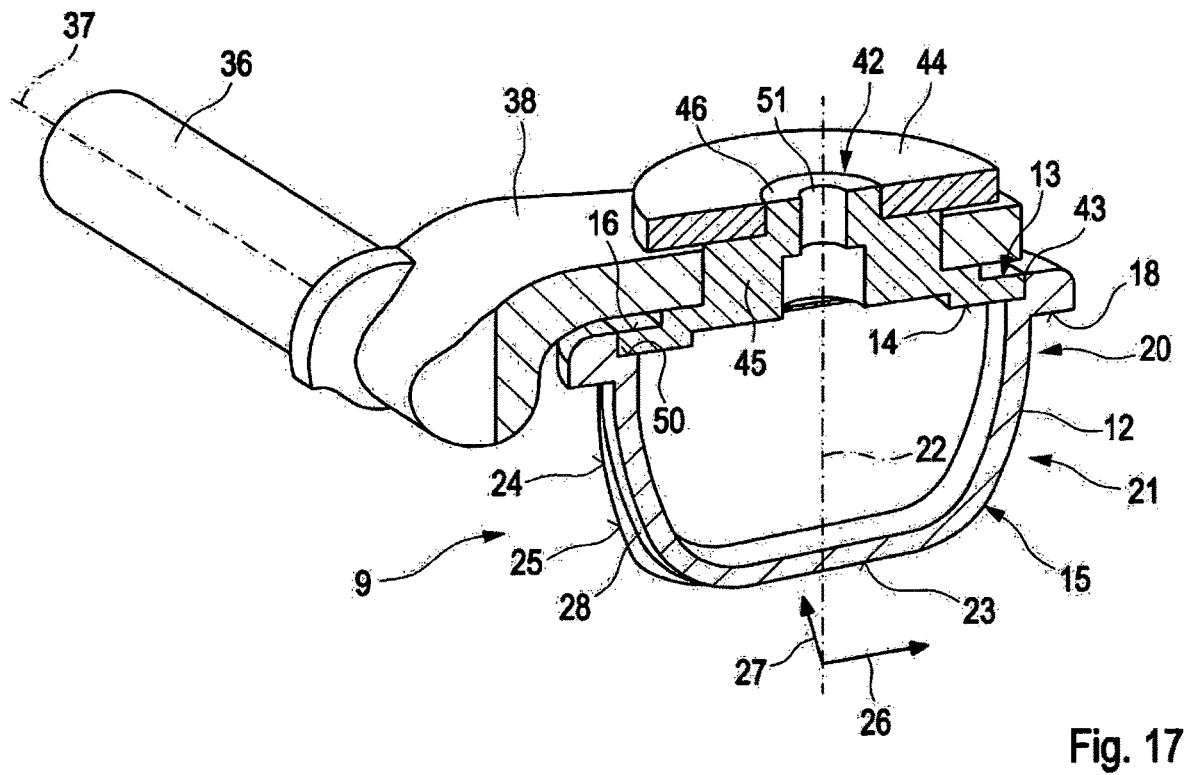
FIG. 17 shows in a perspective plan view the cover element according to FIG. 16.

FIGS. 15 to 17 show the cover element 9 in a ninth and tenth exemplary embodiment. In both exemplary embodiments, the body base cross-section KQ is greater than the plate cross-section PQ. Thereby, the annular surface 18 is integrally formed with the element body 15. The advantage is an improved accessibility for connecting the two components 13, 15 e. g. in a material-bonded joint as a weld. This means a simplified and thus cost effective manufacture of the cover element 9. Furthermore, an absolute tightness of the seam 43 is not required because the seam 43 is located in the bypass duct 31 and does not constitute a flow-relevant connection to the spiral ducts 4, 5.

Figure 18:
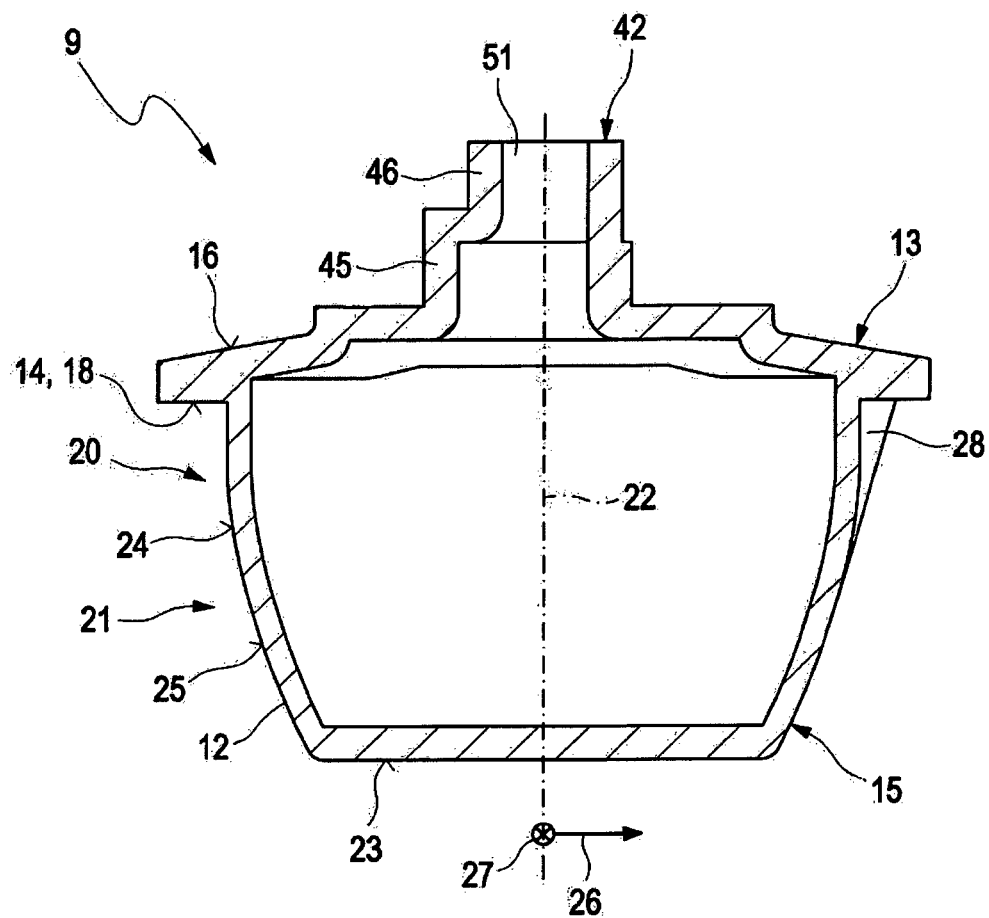
FIG. 18 shows in a section the cover element in an eleventh exemplary embodiment.
Figure 19:
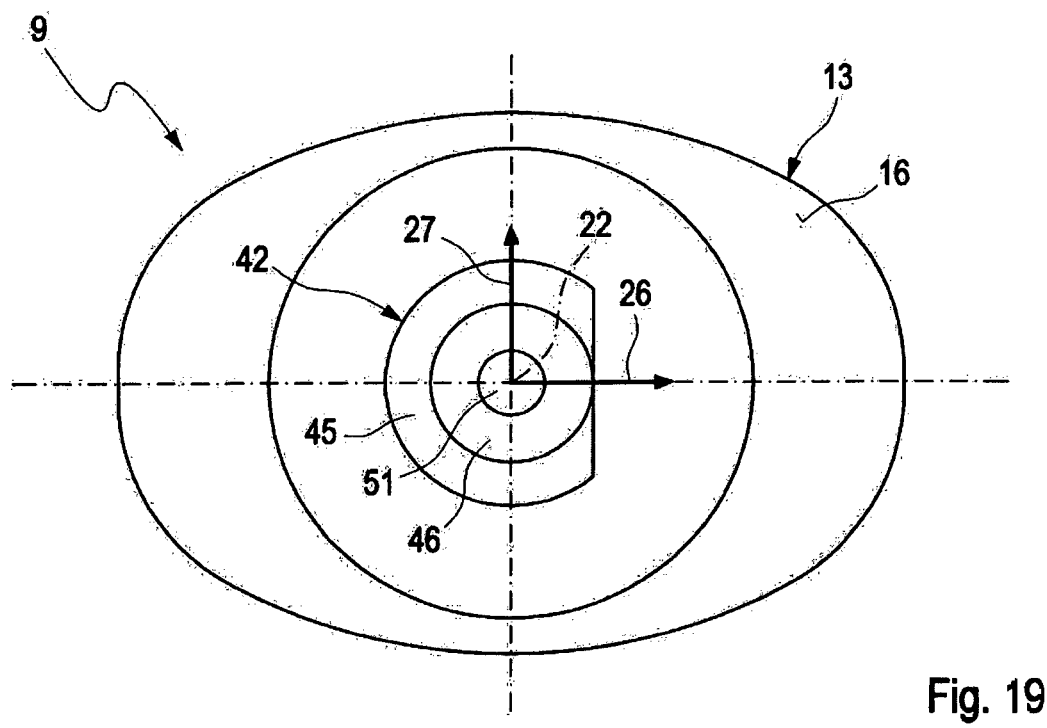
FIG. 19 shows in a plan view the cover element according to FIG. 18.
Figure 20:
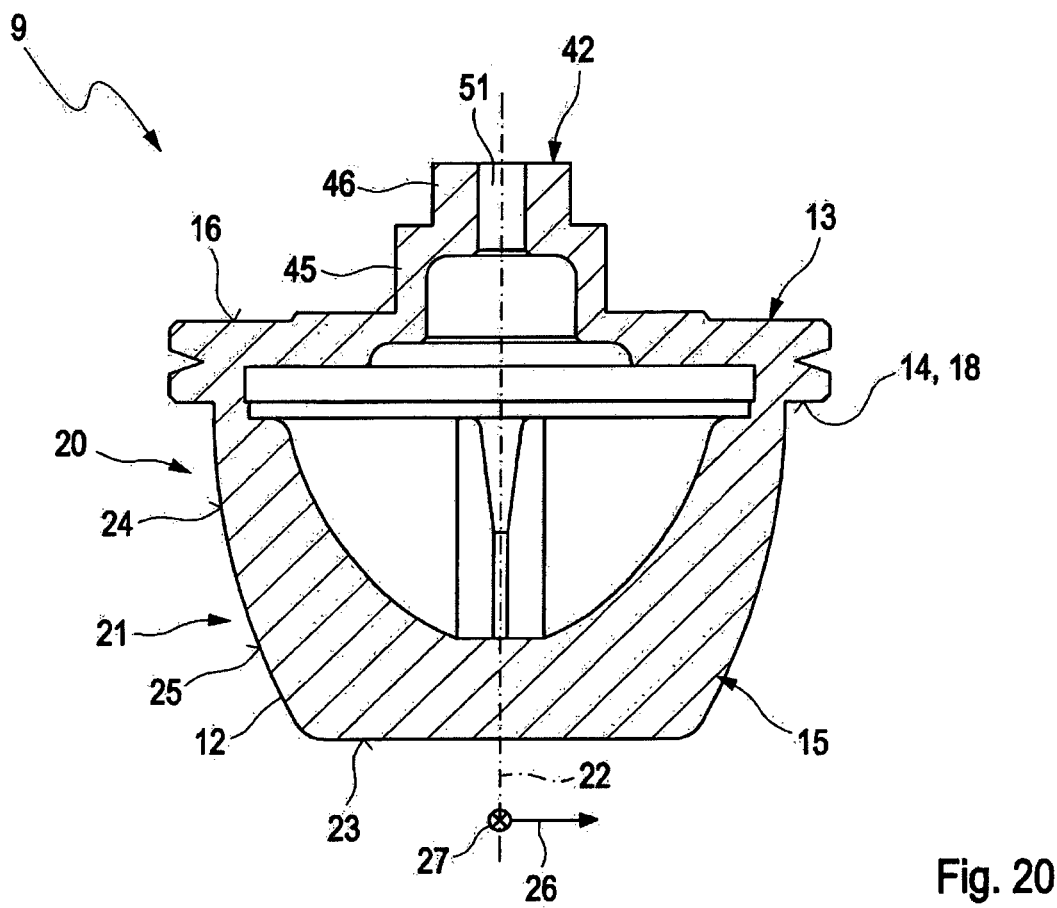
FIG. 20 shows in a section the cover element in a twelfth exemplary embodiment.

Further exemplary embodiments are shown in FIGS. 18 to 20. The cover element 9 illustrated in FIGS. 18 and 19 in an eleventh exemplary embodiment is manufactured by means of a so-called 3D metal printing method, wherein the cover element 9 is integrally formed. In still another variant, the mounting pin 42 is configured for preventing rotation about the longitudinal axis 22.

The groove 28 is formed asymmetrically to the longitudinal axis 22. The asymmetric shape of the groove 28 accounts for the pivoting movement in the exhaust gas conducting section 1 operation carried out during operation in the exhaust gas conducting section 1 in that a gap for movement is provided. In this exemplary embodiment, an asymmetry is obtained in that one side of the cover element 9, the side of the cover element 9, which is arranged closest to the shaft 36, comprises the groove 28, whereas the side opposite to said side of the cover element 9 does not comprise the groove 28. The asymmetry could as well be obtained related to a groove depth. This means that the groove 28 has a greater groove depth on one side of the cover element 9 than on the other side of the cover element 9.

The groove 28 itself contributes to the opening characteristic of the regulating device. In the exemplary embodiment according to FIG. 1, the cover element or the regulating device 8, respectively, exhibits a degressive opening characteristic. Here, with a minimum displacement of the cover element 9 from the closed position, a small outflow of exhaust gas into the bypass duct 31 occurs, however, still no overflow from one spiral duct 4, 5 into the other one. In addition, the groove 28 provides a seal in the form of a labyrinth seal between the spiral ducts 4, 5.

FIG. 20 illustrates the cover element 9 in a twelfth exemplary embodiment. The cover element 9 was machined from a blank and comprises internal reinforcing ribs because of potentially occurring clamping forces.

Figure 21:
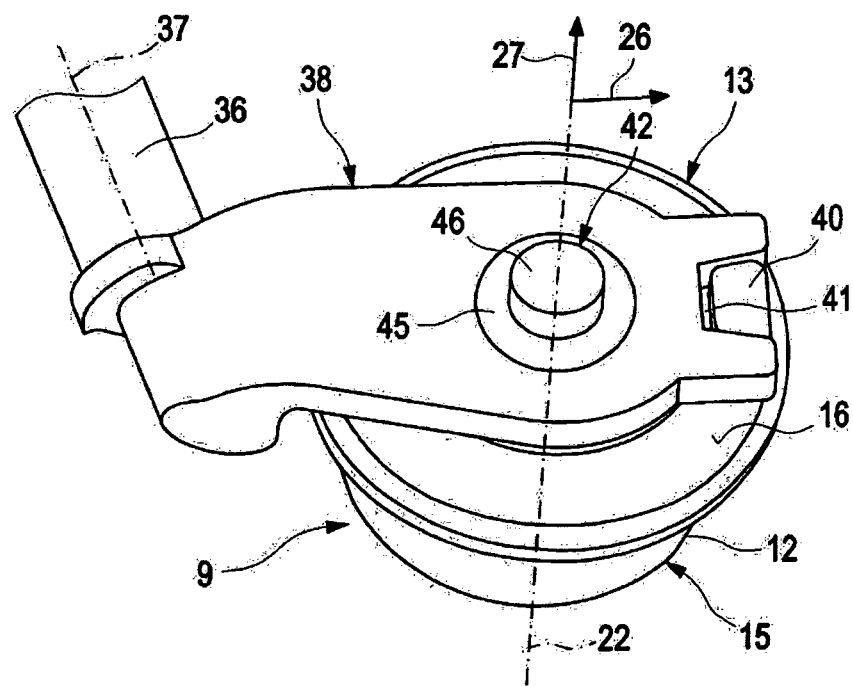
FIG. 21 shows in a perspective view the cover element with the pivot arm in a thirteenth exemplary embodiment.
Figure 22:
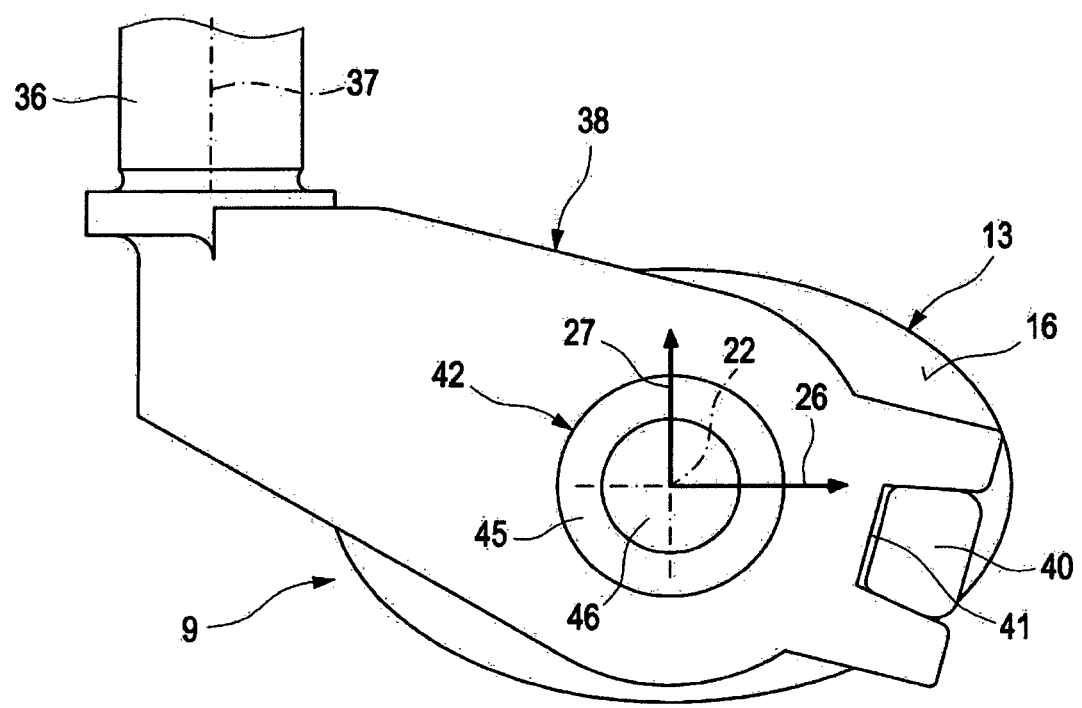
FIG. 22 shows in a plan view the cover element with the pivot arm in a fourteenth exemplary embodiment.

FIGS. 21 and 22 are perspective views of the cover element 9 with the swivel arm 38 in a thirteenth and a fourteenth exemplary embodiment. The cover element 9 according to FIG. 21 is formed rotation symmetrical along the longitudinal axis 22.

Needless to say that the features shown in the individual exemplary embodiments may be combined with one another in various ways.

Another two-piece configuration of the cover element 9 comprises different materials of the base plate 13 and of the element body 15. The base plate 13 is made from a material which exhibits a higher wear resistance because other than the element body 15 it is mounted on the swivel arm 38 or on the movement device 17, respectively, and is thus subjected to increased wear. In particular due to its positioning between the two spiral ducts 4, 5, the element body 15, however, is subjected to a high exhaust gas temperature. This requires its manufacture from a heat resistant material.

It is also possible to manufacture the cover element 9 completely or only partially from sheet metal. Preferably, the manufacture of the base plate 13 as a sheet metal component is to be employed, whereby manufacturing costs may be reduced.

A preferred manufacturing method of the cover element 9 is caulking of the element body 15 with the base plate 13. By means of caulking, a non-positive and a positive connection between two workpieces is made by plastic deformation. Through caulking, the two workpieces 13, 15 are undetachably wedged together at the surfaces facing each other.

The advantage of caulking is also to be seen in that different materials may be joined. Another advantage of caulking is the possibility of transmitting a higher torque compared to e. g. bonding of the workpieces 13, 15.

The cover element 9 may be manufactured both as an integral component and by separately manufacturing the base plate 13 and the element body 15 prior to joining in a precision casting method or in a metal or ceramic powder injection molding method. In addition to caulking, material-bonding methods, e. g. welding or gluing are applicable as joining methods.

Figure 23:
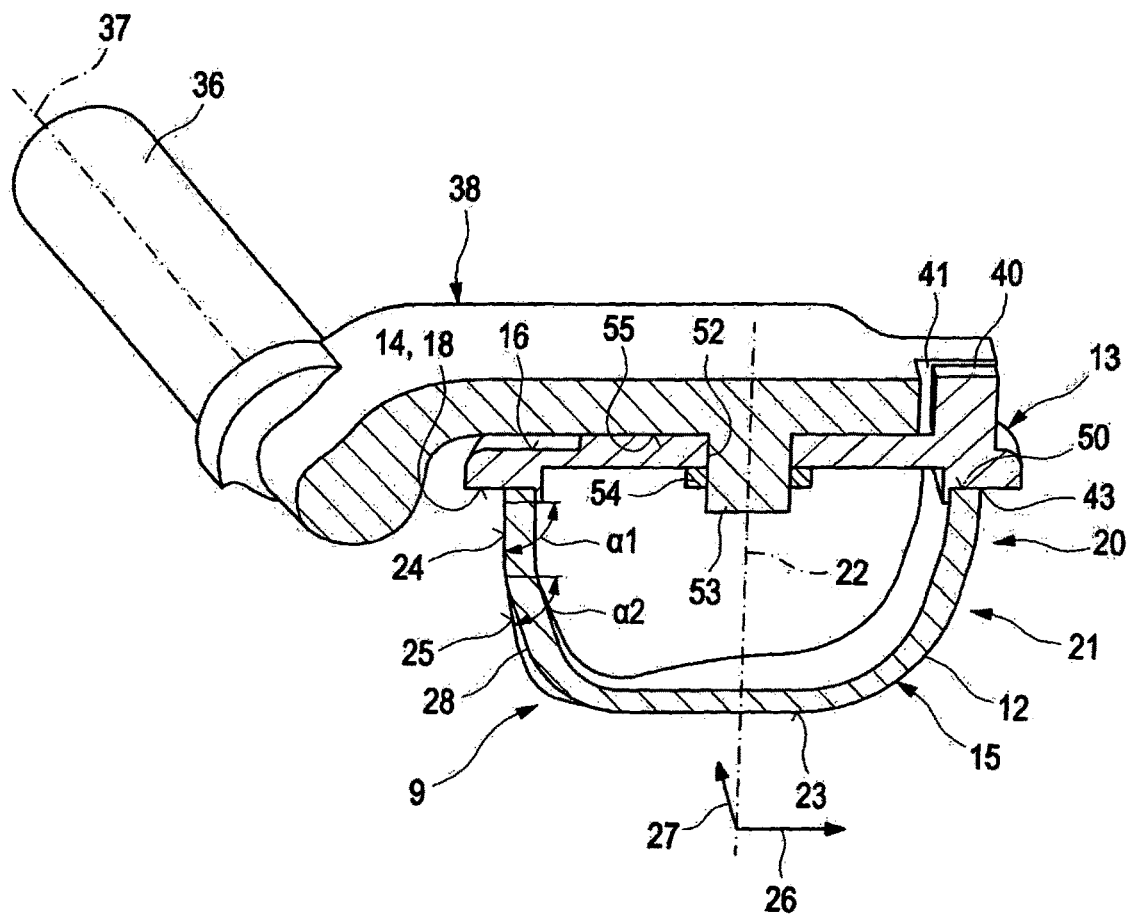
FIG. 23 shows in a perspective sectional view the cover element with the pivot arm of the regulating device in a fifteenth exemplary embodiment.
Figure 24:
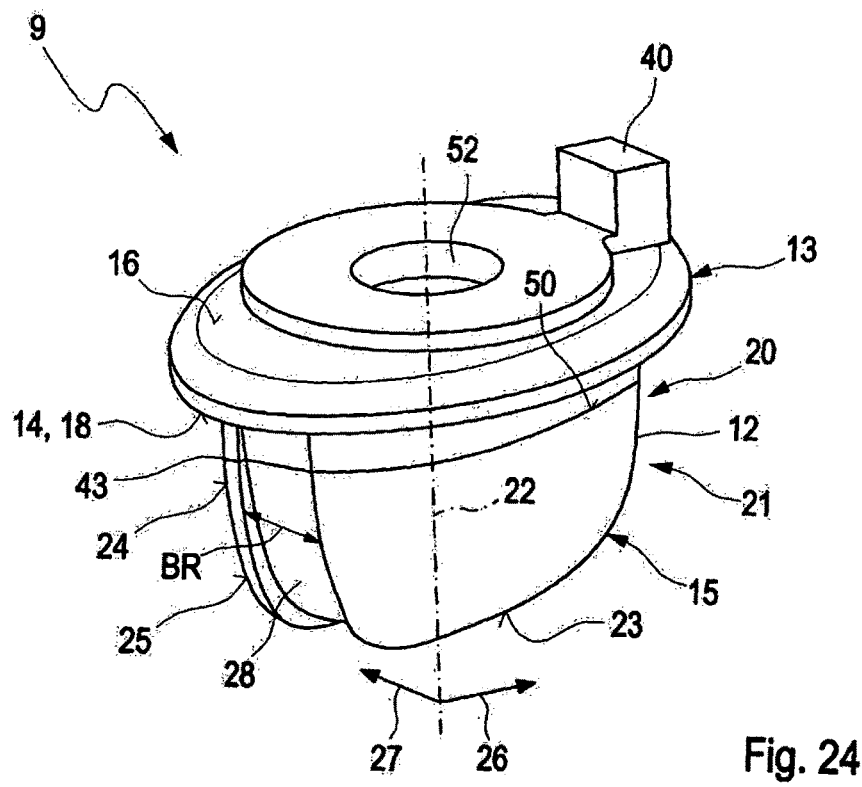
FIG. 24 shows in a perspective view the cover element of the fifteenth exemplary embodiment.

FIGS. 23 and 24 illustrate the cover element 9 in a fifteenth exemplary embodiment. The base plate 13 comprises a reception opening 52 into which a connecting element 53 of the swivel arms 38 may be inserted. The connecting element 53 is integrally formed with the swivel arm 38. The connecting element 53 may as well made independent of the arm 38 and be connected non-positive, and/or positive and/or bonded in a method step in the manufacture of the regulating device 8 with the swivel arm 38.

The connecting element 53 preferably comprises a clearance fit reception opening 52 52 and protrudes into the reception opening 52. For fixing on the base plate 13, a fixing element 54 is provided which is arranged on the first plate surface 14. This means that the fixing element 54 is arranged on an arm surface 55 which faces the cover element 9.

For the realization of the regulating device 8 with the cover element 9 according to the fifteenth exemplary embodiment, the connecting element 53 is inserted into the reception opening 52 of the base plate 13 and an undetachable connection between the base plate 13 and the swivel arm 38 is made by means of the fixing element 54. For this purpose, the connecting element 53 is bonded with the fixing element 54. For fixing of the cover element 9 at the swivel arm 38, the fixing element 54 could also be connected non-positive and/or positive with the connecting element 53, e. g. in the form of a rivet, screw, press connection or in the form of a friction weld connection. After the base plate 13 has been fastened on the swivel arm 38 by means of the fixing element 54 the element body 15 is joined with the base plate 13.

The invention claimed is:

1. A regulating device for an exhaust gas turbocharger,
   wherein the regulating device is accommodated in a through-flow exhaust gas conducting section of the exhaust gas turbocharger,
   wherein the regulating device controls a fluid flow to a turbine wheel which is rotatably accommodated in the exhaust gas conducting section,
   wherein a flow channel formed in the exhaust gas conducting section can be opened and closed by a cover element of the regulating device,
   wherein the cover element is arranged at a swivel arm of the regulating device, which is pivotable about an axis of rotation,
   wherein the cover element is at least partially hollow,
   wherein the cover element comprises a securing pin which engages a corresponding groove of the swivel arm and thereby forms an anti-rotation lock of the cover element on the swivel arm,
   wherein the flow channel and the cover element have corresponding oval cross sections, each having a major axis and a minor axis, and
   wherein the securing pin is asymmetrically arranged on the cover element at an offset from both the major axis and the minor axis of the cover element.

2. The regulating device according to claim 1,
   wherein the flow channel is a bypass duct for bypassing the turbine wheel, and wherein the cover element is configured for opening and closing a second flow channel which is formed as a through-flow opening between a first spiral duct and a second spiral duct of the exhaust gas conducting section.

3. The regulating device according to claim 1, wherein the cover element has an oval dome-shaped outer contour.

4. The regulating device according to claim 3, wherein the cover element has an oval dome-shaped element body and a base plate covering the element body.

5. The regulating device according to claim 4, wherein the element body is oval dome-shaped and is sealed against through-flow at its open wall surface by the base plate.

6. The regulating device according to claim 4, wherein the base plate has a plate cross-section which differs from a body cross-section of the element body.

7. The regulating device according to claim 4, wherein the base plate is formed from sheet metal.

8. The regulating device according to claim 4, wherein the base plate and the element body are made from different materials, and wherein the different materials have different heat expansion coefficients.

9. The regulating device according to claim 4, wherein the cover element comprises a groove which extends along an outer surface of the oval dome-shaped element body through an apex of the oval dome-shaped element body.

10. The regulating device according to claim 9, wherein the groove is formed asymmetrically, having different depths on opposite sides of the cover element.

11. The regulating device according to claim 4, wherein the element body and the base plate are material-bonded with each other.

12. The regulating device according to claim 4, wherein the element body and the base plate are caulked with each other.

13. The regulating device according to claim 1, wherein the cover element comprises a reception opening, wherein the swivel arm comprises a connecting element which protrudes through the reception opening, and wherein the cover element is fixed at the swivel arm with a fixing element which is arranged on a portion of the connecting element which protrudes into the cover element.

14. The regulating device according to claim 1, wherein the swivel arm comprises a connecting element, which is formed protruding into the cover element.

15. The regulating device according to claim 14, wherein a fixing element for fixing the cover element at the swivel arm has a material bonding with the connecting element.

16. The regulating device according to claim 15, wherein a base plate is firmly arranged at the swivel arm by the fixing element.

17. The regulating device according to claim 15, wherein the fixing element is welded to the connecting element.

18. The regulating device according to claim 13, wherein the fixing element is interlocked with the connecting element.

19. The regulating device according to claim 1, wherein the swivel arm is an elongated part having
a first end at which the swivel arm is connected to a shaft, the shaft being arranged in the pivot axis, and
a second end in which the groove is formed.

20. The regulating device according to claim 4, wherein the base plate comprises
a first locking groove and
a second locking groove and
wherein the swivel arm comprises additional securing pins which engage the first locking groove and the second locking groove.

* * * * *